United States Patent
Xiao

(10) Patent No.: US 6,724,514 B2
(45) Date of Patent: Apr. 20, 2004

(54) FARADAY ROTATOR WITH IMPROVED MAGNETOOPTIC PROPERTY

(75) Inventor: Rongfu Xiao, Fremont, CA (US)

(73) Assignee: American Optics Science, Fremont, CA (US)

(*) Notice: Subject to any disclaimer, the term of this patent is extended or adjusted under 35 U.S.C. 154(b) by 0 days.

(21) Appl. No.: 10/198,828

(22) Filed: Jul. 19, 2002

(65) Prior Publication Data
US 2003/0174380 A1 Sep. 18, 2003

Related U.S. Application Data

(60) Provisional application No. 60/364,849, filed on Mar. 18, 2002.

(51) Int. Cl.$^7$ ............... G02F 1/09; G02F 1/00
(52) U.S. Cl. ............. 359/280; 359/284; 359/321
(58) Field of Search ................. 359/280, 284, 359/321

(56) References Cited

U.S. PATENT DOCUMENTS

2003/0174380 A1 * 9/2003 Xiao ............... 359/280

* cited by examiner

Primary Examiner—David N. Spector
(74) Attorney, Agent, or Firm—Sawyer Law Group LLP

(57) ABSTRACT

A liquid phase epitaxy method is used to grow the Faraday rotator with a small saturation field (Hs). The Faraday rotator has the formula: $Bi_{3-x-y-z}Gd_xTb_yM_zFe_{5-w-n}Ga_wP_nO_{12}$, where M is selected from Y, Yb, Lu, and P is selected from Al, Si, Ge. X, y, w and n are chosen from the ranges of $0.5 \leq x \leq 1.0$, $0.5 \leq y \leq 1.0$, $0.2 \leq z \leq 0.5$, $1.5 \leq x+y+z \leq 2.0$, $0.5 \leq w \leq 1.0$, $0.15 \leq n \leq 0.5$, $0.8 \leq w+n \leq 1.2$. Without M and P, a Type-L Faraday rotator with a linear BH curve is provided, which is well suited for variable optical attenuators. With M and P, a Type-R Faraday rotator with a rectangular hysteresis loop is provided, which is well suited for optical switches. Both are also well suited for use in optical isolators and circulators.

16 Claims, 5 Drawing Sheets

FARADAY ROTATOR WITH IMPROVED MAGNETOOPTIC PROPERTY

CROSS-REFERENCE TO RELATED APPLICATION

This application is claiming under 35 U.S.C. §119(e) the benefit of provisional patent application Ser. No. 60/364,849, filed Mar. 18, 2002 abandoned.

FIELD OF THE INVENTION

The present invention relates to Faraday rotators, and more particularly to the magnetic properties of materials comprising Faraday rotators.

BACKGROUND OF THE INVENTION

Growth of magnet garnets, or Faraday rotators, is well known in the art. Recent interest in Faraday rotators is due to the need for optical isolators and circulators where a non-reciprocal polarization rotation of a linearly polarized light utilizing the Faraday effect in magnetic garnet is required. FIG. 1A illustrates a BH curve of a conventional latched Faraday rotator. As illustrated by FIG. 1A, this Faraday rotator has a large coercivity (Hc>400 Oe), i.e., a large hysteresis loop, and thus requires a large external magnetic field to switch the state of the Faraday rotator. Therefore, this Faraday rotator is used in permanent latching applications in isolators and circulators to reduce the overall size of the devices, and is not suitable for optical switching which requires a small Hc.

FIG. 1B illustrates a BH curve of another conventional Faraday rotator. As illustrated by FIG. 1B, the BH curve for this Faraday rotator is neither linear nor latched. Thus, it is not suitable for use in variable optical attenuators.

Accordingly, there exists a need for an improved Faraday rotator. The improved Faraday rotator should have a small saturation magnetic field. The present invention addresses such a need.

SUMMARY OF THE INVENTION

A liquid phase epitaxy method is used to grow the Faraday rotator with a small saturation field (Hs). The Faraday rotator has the formula: $Bi_{3-x-y-z}Gd_xTb_yM_zFe_{5-w-n}Ga_wP_nO_{12}$, where M is selected from Y, Yb, Lu, and P is selected from Al, Si, Ge. X, y, w and n are chosen from the ranges of $0.5 \leq x \leq 1.0$, $0.5 \leq y \leq 1.0$, $0.2 \leq z \leq 0.5$, $1.5 \leq x+y+z \leq 2.0$, $0.5 \leq w \leq 1.0$, $0.15 \leq n \leq 0.5$, $0.8 \leq w+n \leq 1.2$. Without M and P, a Type-L Faraday rotator with a linear BH curve is provided, which is well suited for variable optical attenuators. With M and P, a Type-R Faraday rotator with a rectangular hysteresis loop is provided, which is well suited for optical switches. Both are also well suited for use in optical isolators and circulators.

DETAILED DESCRIPTION

The present invention provides an improved Faraday rotator. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A Type-L Faraday rotator in accordance with the present invention is formed using a liquid phase epitaxy method has the formula: $Bi_{3-x-y}Gd_xTb_yFe_{5-w}Ga_wO_{12}$, where x, y, and w are within the ranges of $0.5 \leq x \leq 1.0$, $0.5 \leq y \leq 1.0$, and $0.8 \leq w \leq 1.0$. This Type-L Faraday rotator has a small saturation field (Hs) and a linear BH curve. Thus, it is well suited for use in an optical isolator or circulator that requires a small Hc. It is also well suited for use in a variable optical attenuator.

A Type-R Faraday rotator in accordance with the present invention is formed using a liquid phase epitaxy method and has the formula: $Bi_{3-x-y-z}Gd_xTb_yM_zFe_{5-w-n}Ga_wP_nO_{12}$, where M is selected from a group consisting of Y, Yb, Lu, and P is selected from a group consisting of Al, Si, Ge. The x, y, z, w and n are within the ranges of $0.8 \leq x \leq 1.0$, $0.5 \leq y \leq 1.0$, $0.2 \leq z \leq 0.5$, $0.5 \leq w \leq 1.0$ and $0.2 \leq n \leq 0.5$. Additionally, $1.5 \leq 3-x-y-z \leq 2.0$ and $0.8 \leq w+n \leq 1.2$. Too much Gd results in a large temperature dependence of magnetic moment, and too much w+n yields a very small magnetic moment and hence reduces rotation power. This Type-R Faraday rotator has a BH curve with a rectangular hysteresis loop and a low Hc. This Type-R Faraday rotator is thus well suited for use in an optical switch that requires a small Hc.

To more particularly describe the features of the present invention, please refer to FIGS. 2 through 6 in conjunction with the discussion below.

Figure 1A:
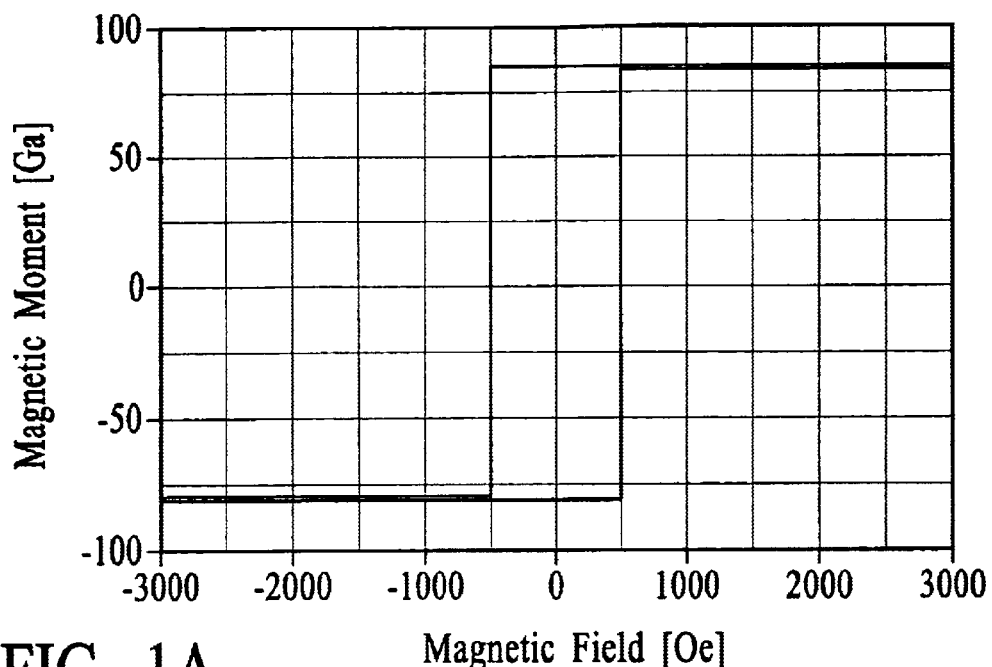
FIG. 1A illustrates a BH curve of a conventional Type-R Faraday rotator.
Figure 1B:
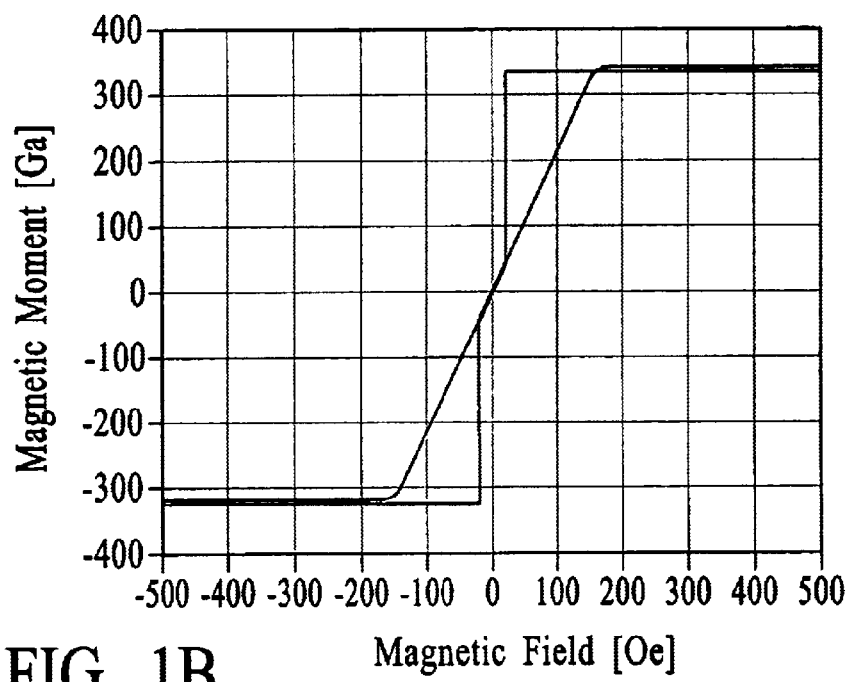
FIG. 1B illustrates a BH curve of another conventional Faraday rotator.
Figure 2:
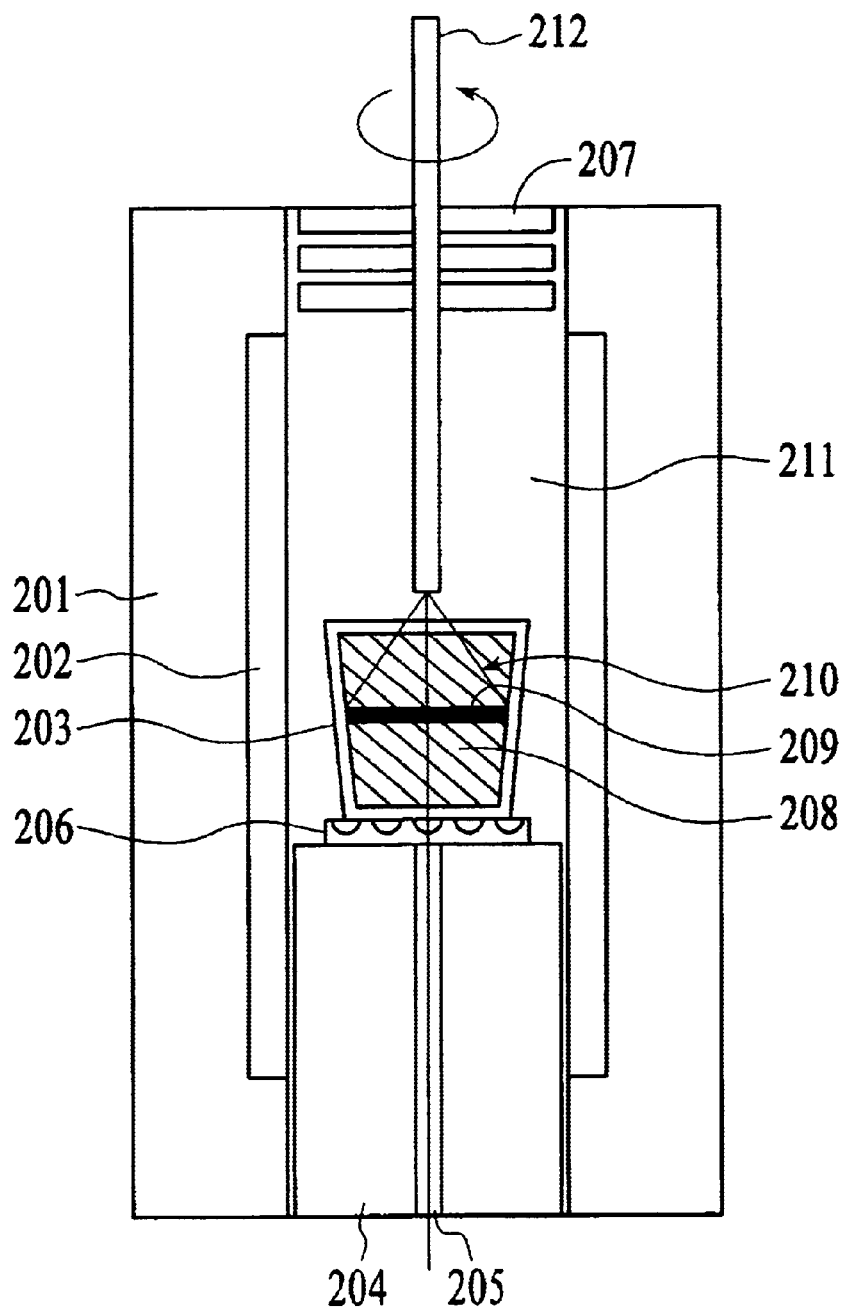
FIG. 2 illustrates a liquid phase epitaxy apparatus for growing a Faraday rotator in accordance with the present invention.

FIG. 2 illustrates a liquid phase epitaxy apparatus for growing a Faraday rotator in accordance with the present invention. The apparatus, commonly referred to as a tube furnace, comprises an inner wall 201 made from quartz, which is heated by a tubular heating element 202. Inside the furnace is a platinum crucible 203, which is supported by a bottom ceramic supporter 204 with a thermocoupler 205. The bottom ceramic supporter 204 and thermocoupler 205 are in contact with a bottom heater 206. The upper entrance is heat screened by ceramic plates 207. The melt 208 is contained in the crucible 203, and a substrate 209 is immersed in the melt 208. The substrate 209 is held by a three-legged platinum wire holder 210, which is mounted on ceramic tube 211. The ceramic tube 211 is rotated by a stepping motor 212.

Figure 3:
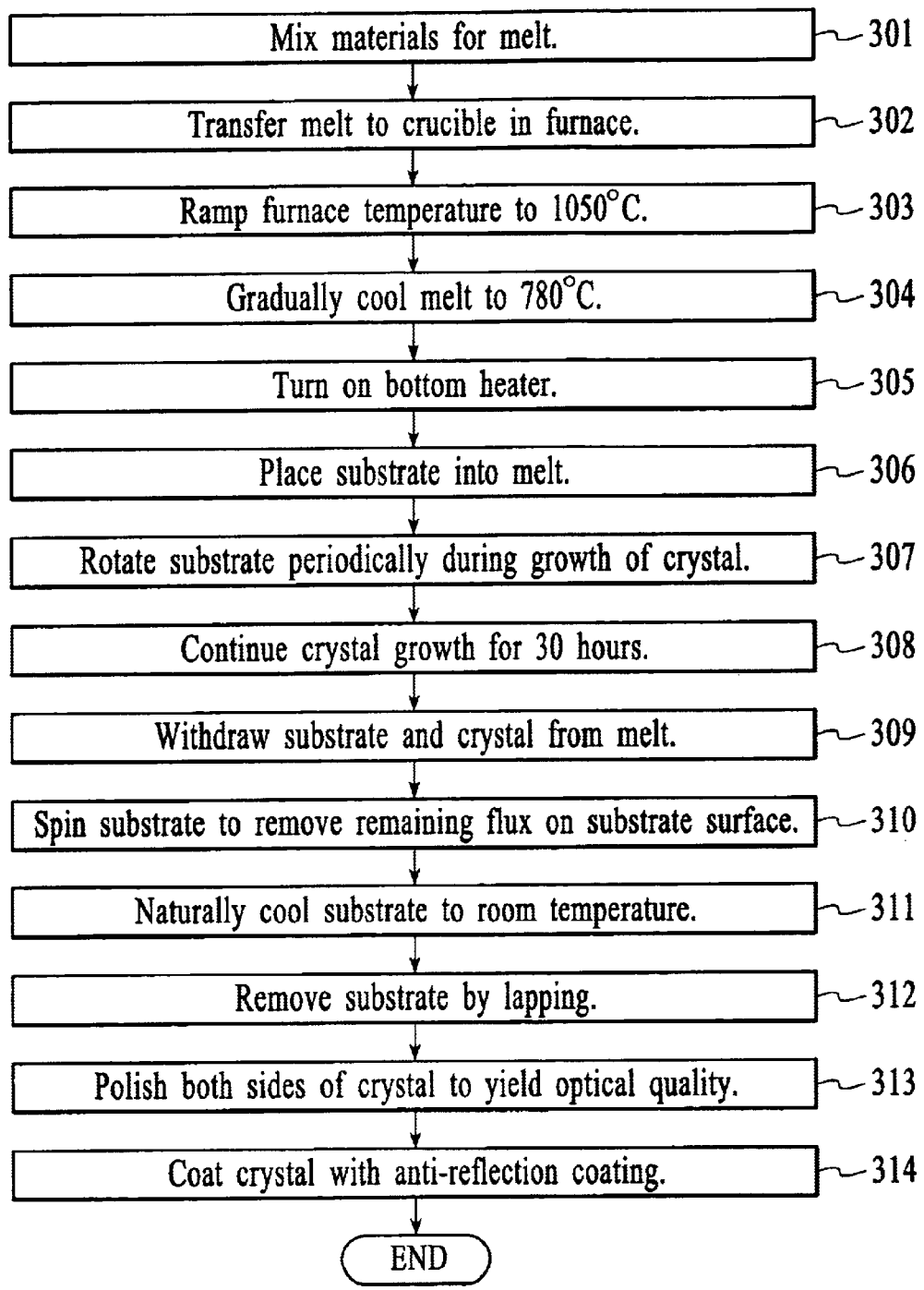
FIG. 3 is a flowchart illustrating a preferred embodiment of a method for growing the Faraday rotator in accordance with the present invention.

FIG. 3 is a flowchart illustrating a preferred embodiment of a method for growing the Faraday rotator in accordance with the present invention. Referring to both FIGS. 2 and 3, first, the materials for the melt 208 in the form of fine powder are mixed, via step 301, by a mechanical mixer for approximately 12 hours. Table 1 below shows example melt compositions in accordance with the present invention. The melt composition for a first preferred embodiment of the Faraday rotator results in a Type-L Faraday rotator. The melt composition for a second preferred embodiment of the Faraday rotator results in a Type-R Faraday rotator.

TABLE 1

| Materials in the melt | 1st Preferred Embodiment: Weight (g) | 2nd Preferred Embodiment: Weight (g) |
|---|---|---|
| PbO | 1810 | 1810 |
| B2O3 | 113 | 113 |
| Bi2O3 | 2210 | 2210 |
| Y2O3 | 0 | 2.2 |
| Gd2O3 | 14.7 | 12.5 |
| Tb2O3 | 12.1 | 12.1 |
| Fe2O3 | 235 | 235 |
| Ga2O3 | 45 | 45 |
| Al2O3 | 0 | 5 |

Next, the melt 208 is transferred to the crucible 203 in the furnace, via step 302. The furnace is ramped to a temperature of approximately 1050° C., via step 303, and the melt soaks for approximately 5 hours to ensure that the melt 208 is fully homogenized. Then, the melt 208 is gradually cooled to approximately 780° C., via step 304. After the temperature stabilizes at 780° C., the bottom heater 206 is turned on to provide additional heat to the bottom of the melt 208, via step 305. The bottom heater 206 prevents growth of polycrystallites at the bottom of the crucible 203. Next, the substrate 209 is immersed in the melt 208, via step 306. Growth of the crystal begins immediately. During the growth of the crystal, the substrate 209 is rotated periodically, via step 307, at a speed of approximately ±60 rpm. The growth of the crystal continues for approximately 30 hours, via step 308, which yields a crystal film with a thickness of about 0.55 mm. Then, the substrate 209 and crystal are withdrawn from the melt 208, via step 309. The substrate 209 is then spun at a fast rotation, of about 300 rpm, to remove any remaining flux on the substrate surface, via step 310. Then, the substrate 209 is naturally cooled to approximately room temperature, via step 311, which takes approximately 10 hours. The substrate 209 is removed by lapping, via step 312, and the crystal is polished on both sides to yield optical quality, via step 313. Then, the two surfaces of the crystal are coated with anti-reflection coatings, via step 314, to reduce reflection.

Figure 4:
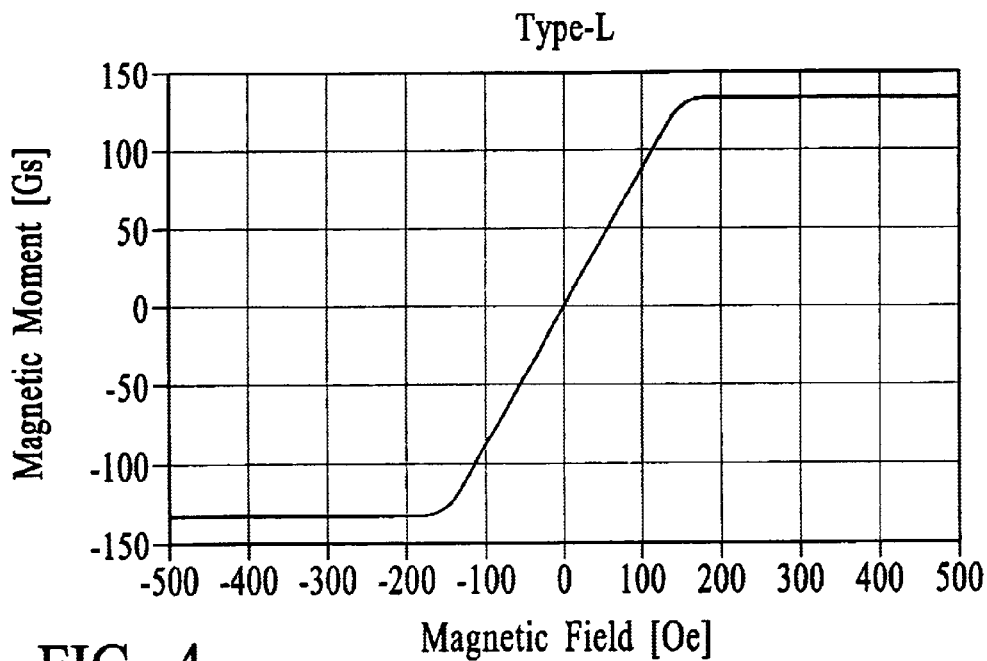
FIG. 4 illustrates a BH curve for a Type-L Faraday rotator in accordance with the present invention.

In the first preferred embodiment, where the Faraday rotator is of Type-L, the crystal has the formula: $Bi_{1.35}Gd_{0.9}Tb_{0.75}Fe_{4.0}Ga_{1.0}O_{12}$. The final thickness is approximately 0.40 mm, and yields a rotation angle of approximately 45 degrees at 1.55 mm wavelength. Its BH curve is illustrated in FIG. 4. The BH curve is linear and the Hs is small, less than approximately 200 Oe. This Faraday rotator is thus well suited for use in optical isolators and circulators, as well as in variable optical attenuators.

Figure 5:
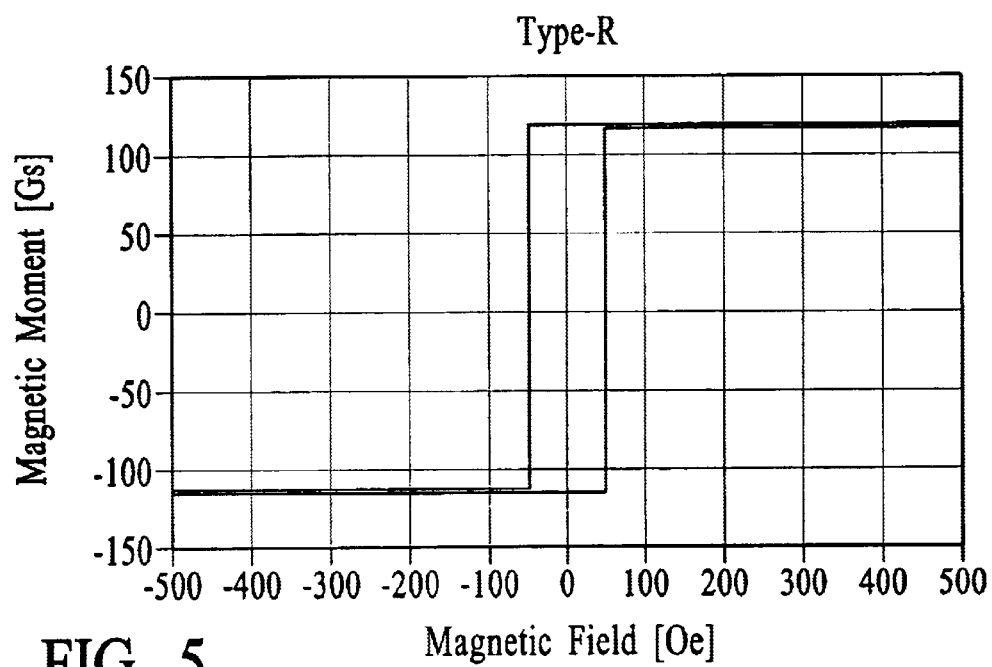
FIG. 5 illustrates a BH curve for a Type-R Faraday rotator in accordance with the present invention.
Figure 6:
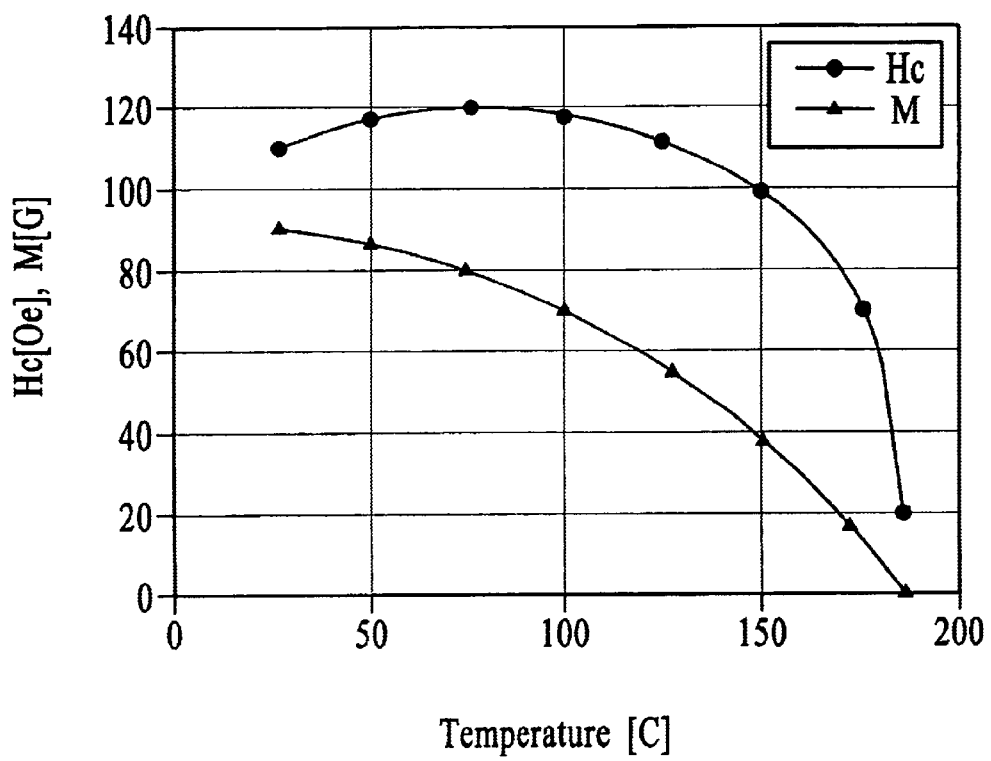
FIG. 6 illustrates a temperature dependence of coercivity and magnetic moment graph for the Type-R Faraday rotator in accordance with the present invention.

In the second preferred embodiment, where the Faraday rotator is of Type-R, the crystal has the formula: $Bi_{1.25}Gd_{0.8}Tb_{0.55}Y_{0.4}Fe_{3.8}Ga_{0.7}Al_{0.5}O_{12}$. The final thickness of the crystal is approximately 0.45 mm, and yields a rotation angle of approximately 45 degrees at 1.55 mm wavelength. Its BH curve is illustrated in FIG. 5, and its temperature dependence of coercivity (Hc) and magnetic moment (M) is illustrated in FIG. 6. The hysteresis loop is rectangular and thus has a good latching property, since a pulsed control signal is enough to turn the switch on and off. Also, the crystal has a small Hc of less than approximately 100 Oe and thus only a small external magnetic field is required to turn the switch on and off. This has the advantage of reducing power consumption and of reducing the risk of thermal instability due to unnecessary Joule-heating.

An improved Faraday rotator has been disclosed. A liquid phase epitaxy method is used to grow the Faraday rotator with a small saturation field (Hs). A Faraday rotator in accordance with the present invention has the formula: $Bi_{3-x-y-z}Gd_xTb_yM_zFe_{5-w-n}Ga_wP_nO_{12}$, where element M is selected from a group consisting of Y, Yb, Lu, and P is selected from a group consisting of Al, Si, Ge. The x, y, w and n are chosen from the ranges of $0.5 \leq x \leq 1.0$, $0.5 \leq y \leq 1.0$, $0.2 \leq z \leq 0.5$, $1.5 \leq x+y+z \leq 2.0$, $0.5 \leq w \leq 1.0$, $0.15 \leq n \leq 0.5$, $0.8 \leq w+n \leq 1.2$. Without M and P, a Type-L Faraday rotator in accordance with the present invention is provided, which exhibits a linear BH curve. When M and P are added, a Type-R Faraday rotator in accordance with the present invention is provided, which exhibits a rectangular hysteresis loop. The Faraday rotator is well suited for use in optical isolators and circulators. The Type-L Faraday rotator is also well suited for use in a variable optical attenuator. The Type-R Faraday rotator is particularly suitable for optical switch in which only a short pulse of control signal is needed to turn on or off the switch.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A Faraday rotator having a formula:

$$Bi_{3-x-y-z}Gd_xTb_yM_zFe_{5-w-n}Ga_wP_nO_{12},$$

wherein M is selected from a group consisting of Y, Yb, Lu, wherein P is selected from a group consisting of Al, Si, Ge, wherein x has a range of $0.8 \leq x \leq 1.0$, wherein y has a range of $0.5 \leq y \leq 1.0$, wherein z has a range of $0.2 \leq z \leq 0.5$ wherein w has a range of $0.5 \leq w \leq 1.0$, and wherein n has a range of $0.2 \leq n \leq 0.5$.

2. The Faraday rotator of claim 1, wherein x, y, and z further has the range of $1.5 \leq 3-x-6-z \leq 2.0$.

3. The Faraday rotator of claim 1, wherein w and n further has the range of $0.8 \leq w+n \leq 1.2$.

4. The Faraday rotator of claim 1, wherein the Faraday rotator has a coercivity of less than 100 Oe.

5. The Faraday rotator of claim 1, wherein the Faraday rotator's BH curve has a rectangular hysteresis loop.

6. The Faraday rotator of claim 1, wherein the Faraday rotator has a rotation angle of approximately 45 degrees at 1.55 mm wavelength.

7. A Faraday rotator having a formula:

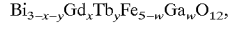

$$Bi_{3-x-y}Gd_xTb_yFe_{5-w}Ga_wO_{12},$$

wherein x has a range of $0.5 \leq x \leq 1.0$, wherein y has a range of $0.5 \leq y \leq 1.0$, and wherein w has a range of $0.8 \leq w \leq 1.0$.

8. The Faraday rotator of claim 7, wherein the Faraday rotator has a saturation field of less than 200 Oe.

9. The Faraday rotator of claim 7, wherein the Faraday rotator has a linear BH curve.

10. The Faraday rotator of claim 7, wherein the Faraday rotator has a rotation angle of approximately 45 degrees at 1.55 mm wavelength.

11. An optical isolator, comprising:

a Faraday rotator having a formula:

$$Bi_{3-x-y-z}Gd_xTb_yM_zFe_{5-w-n}Ga_wP_nO_{12},$$

wherein M is selected from a group consisting of Y, Yb, Lu,

Wherein P is selected from a group consisting of Al, Si, Ge, wherein x has a range of $0.8 \leq x \leq 1.0$, wherein y has a range of $0.5 \leq y \leq 1.0$, wherein z has a range of $0.2 \leq z \leq 0.5$ wherein w has a range of $0.5 \leq w \leq 1.0$, and wherein n has a range of $0.2 \leq n \leq 0.5$.

12. An optical circulator, comprising:

a Faraday rotator having a formula:

$$Bi_{3-x-y-z}Gd_xTb_yM_zFe_{5-w-n}Ga_wP_nO_{12},$$

wherein M is selected from a group consisting of Y, Yb, Lu, wherein P is selected from a group consisting of Al, Si, Ge, wherein x has a range of $0.8 \leq x \leq 1.0$, wherein y has a range of $0.5 \leq y \leq 1.0$, wherein z has a range of $0.2 \leq z \leq 0.5$ wherein w has a range of $0.5 \leq w \leq 1.0$, and wherein n has a range of $0.2 \leq n \leq 0.5$.

13. An optical switch, comprising:

a Faraday rotator having a formula:

$$Bi_{3-x-y-z}Gd_xTb_yM_zFe_{5-w-n}Ga_wP_nO_{12},$$

wherein M is selected from a group consisting of Y, Yb, Lu, wherein P is selected from a group consisting of Al, Si, Ge, wherein x has a range of $0.8 \leq x \leq 1.0$, wherein y has a range of $0.5 \leq y \leq 1.0$, wherein z has a range of $0.2 \leq z \leq 0.5$ wherein w has a range of $0.5 \leq w \leq 1.0$, and wherein n has a range of $0.2 \leq n \leq 0.5$.

14. An optical isolator, comprising:

a Faraday rotator having a formula:

$$Bi_{3-x-y}Gd_xTb_yFe_{5-w}Ga_wO_{12},$$

wherein x has a range of $0.5 \leq x \leq 1.0$, wherein y has a range of $0.5 \leq y \leq 1.0$, and wherein w has a range of $0.8 \leq w \leq 1.0$.

15. An optical circulator, comprising:

An optical isolator, comprising:

a Faraday rotator having a formula:

$$Bi_{3-x-y}Gd_xTb_yFe_{5-w}Ga_wO_{12},$$

wherein x has a range of $0.5 \leq x \leq 1.0$, wherein y has a range of $0.5 \leq y \leq 1.0$, and wherein w has a range of $0.8 \leq w \leq 1.0$.

16. An optical switch, comprising:

An optical isolator, comprising:

a Faraday rotator having a formula:

$$Bi_{3-x-y}Gd_xTb_yFe_{5-w}Ga_wO_{12},$$

wherein x has a range of $0.5 \leq x \leq 1.0$, wherein y has a range of $0.5 \leq y \leq 1.0$, and wherein w has a range of $0.8 \leq w \leq 1.0$.

* * * * *